(12) United States Patent  
Hoshi et al.

(10) Patent No.: US 11,187,144 B2  
(45) Date of Patent: Nov. 30, 2021

(54) DIFFUSER AND TURBOCHARGER

(71) Applicant: MITSUBISHI HEAVY INDUSTRIES ENGINE & TURBOCHARGER, LTD., Sagamihara (JP)

(72) Inventors: Toru Hoshi, Tokyo (JP); Reiko Takashima, Tokyo (JP); Takao Yokoyama, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 16/769,379

(22) PCT Filed: Dec. 7, 2017

(86) PCT No.: PCT/JP2017/043980  
§ 371 (c)(1),  
(2) Date: Jun. 3, 2020

(87) PCT Pub. No.: WO2019/111370  
PCT Pub. Date: Jun. 13, 2019

(65) Prior Publication Data  
US 2020/0291847 A1 Sep. 17, 2020

(51) Int. Cl.  
*F01D 17/14* (2006.01)  
*F02B 37/00* (2006.01)  
*F01D 25/30* (2006.01)

(52) U.S. Cl.  
CPC ............ *F02B 37/00* (2013.01); *F01D 17/143* (2013.01); *F01D 25/30* (2013.01)

(58) Field of Classification Search  
CPC ...... F02B 37/00; F02B 37/183; F01D 17/143; F01D 25/30  
(Continued)

(56) References Cited

U.S. PATENT DOCUMENTS 3,420,435 A * 1/1969 Jarosz et al. .......... F04D 29/441  
  415/207  
3,802,187 A 4/1974 Titus  
(Continued)

FOREIGN PATENT DOCUMENTS

CN 101205815 A 6/2008  
CN 202209491 U 5/2012  
(Continued)

OTHER PUBLICATIONS

International Search Report (Form PCT/ISA/210) for International Application No. PCT/JP2017/043980, dated Jan. 9, 2018, with English translation.  
(Continued)

*Primary Examiner* — J. Todd Newton  
(74) *Attorney, Agent, or Firm* — Birch, Stewart, Kolasch & Birch, LLP

(57) ABSTRACT

A diffuser includes a connection section and a body section. The connection section extends from an outlet of turbine rotor blades. The body section is connected to an end of the connection section on a downstream side and has a larger flow passage sectional area than the connection section. The shape of the flow passage sectional surface of the connection section is formed into a circle at an outlet of the turbine rotor blades and is formed into an ellipse at an inlet of the body section. The shape of the flow passage sectional surface of the connection section is further formed to be gradually enlarged in a long-axis direction of the ellipse from the outlet of the turbine rotor blades toward the inlet of the body section.

13 Claims, 4 Drawing Sheets

(58) Field of Classification Search
USPC .......................................................... 60/605.1
See application file for complete search history.

(56) References Cited

U.S. PATENT DOCUMENTS

| | | | | |
|---|---|---|---|---|
| 3,905,721 | A * | 9/1975 | Fitzpatrick | F04D 29/441 415/208.3 |
| 5,473,897 | A * | 12/1995 | Elvekjaer | F02B 39/00 60/612 |
| 5,603,605 | A * | 2/1997 | Fonda-Bonardi | F01D 25/30 415/211.2 |
| 2008/0148728 | A1 | 6/2008 | Wood | |
| 2015/0010390 | A1* | 1/2015 | Onitsuka | F02D 41/0255 415/145 |
| 2018/0142701 | A1* | 5/2018 | Woehr | F04D 29/444 |

FOREIGN PATENT DOCUMENTS

| | | |
|---|---|---|
| EP | 1936126 A2 | 6/2008 |
| JP | 61-5334 U | 1/1986 |
| JP | 61-197214 U | 12/1986 |
| JP | 7-259574 A | 10/1995 |
| JP | 2002-161738 A | 6/2002 |
| JP | 2006-283587 A | 10/2006 |
| JP | 2012-255426 A | 12/2012 |
| JP | 2015-14258 A | 1/2015 |
| WO | WO 2014/188245 A2 | 11/2014 |

OTHER PUBLICATIONS

Written Opinion of the International Search Report (Form PCT/ISA/237) for International Application No. PCT/JP2017/043980, dated Jan. 9, 2018, with English translation.

* cited by examiner

DIFFUSER AND TURBOCHARGER

TECHNICAL FIELD

The present invention relates to a diffuser and a turbocharger.

BACKGROUND ART

Patent Literature 1 describes a turbocharger provided with an exhaust flow passage on a downstream side of a turbine housing. The turbocharger described in Patent Literature 1 includes a bypass passage that communicates between an inflow passage into a turbine and an exhaust flow passage and a waste gate valve that opens and closes the bypass passage. Exhaust gas flows from the inflow passage to the exhaust flow passage via the bypass passage without passing through the turbine by opening the waste gate valve. Thus, it is possible to curb excessive rotation of the turbine at the time of a high rotation rate of the turbine, in particular.

CITATION LIST

Patent Literature

Patent Literature 1
 Japanese Unexamined Patent Application, First Publication No. 2015-014258

SUMMARY OF INVENTION

Technical Problem

A supercharger described in Patent Literature 1 is adapted such that the bypass passage is connected to the diffuser that forms the exhaust flow passage on the downstream side of the turbine and the waste gate valve is disposed therein. In order to secure space for providing the bypass passage and the waste gate valve in the diffuser, the flow passage sectional area of the diffuser may be steeply enlarged. In such a case in which the flow passage sectional area of the diffuser is steeply enlarged, the flow of the exhaust gas may separate from the inner surface of the diffuser or may form a vortex, which may lead to a problem that it is difficult to improve the efficiency of the diffuser.

The turbocharger is provided in an engine compartment of a vehicle such as a car. Therefore, it is desired to improve efficiency of the diffuser without leading to an increase in size of the diffuser.

The present invention provides a diffuser and a turbocharger capable of improving efficiency while curbing an increase in size.

Solution to Problem

According to a first aspect of the present invention, a diffuser includes a connection section and a body section. The connection section extends from an outlet of turbine rotor blades. The body section is connected to an end of the connection section on a downstream side and has a larger flow passage sectional area than the connection section. The shape of a flow passage sectional surface of the connection section is formed into a circle at the outlet of the turbine rotor blades and is formed into an ellipse at an inlet of the body section. The shape of the flow passage sectional surface of the connection section is further formed to be gradually enlarged in a long-axis direction of the ellipse from the outlet of the turbine rotor blades toward the inlet of the body section.

In the first aspect, the shape of the flow passage sectional surface of the connection section is formed such that a long axis of the ellipse increases toward the downstream side. Therefore, exhaust gas flowing through the connection section is likely to spread in the long-axis direction of the ellipse of the connection section when the exhaust gas flows from the connection section into the body section. By the exhaust gas spreading inside the body section in this manner, it is possible to reduce the flow rate of the exhaust gas.

Thus, it is possible to improve efficiency of the diffuser while curbing an increase in size of the diffuser.

According to a second aspect of the present invention, a connection section center that is a center of the ellipse of the connection section at the inlet of the body section may be located at a position deviating from a body section center that is a center of the flow passage sectional surface of the body section, in the first aspect. A long axis of the ellipse may extend to a side at least closer to the body section center than to the connection section center.

In the second aspect, the connection section center deviates from the body section center. In other words, the body section is formed such that an inner space thereof is further enlarged on the side on which the body section center is disposed than on the side of the connection section center. In addition, the long axis extends further toward the body section center than toward the connection section center. Therefore, it is possible to allow exhaust gas flowing from the inlet of the body section into the body section to spread to the side on which the inner space of the body section is enlarged.

According to a third aspect of the present invention, the flow passage sectional area of the connection section may be gradually enlarged from the outlet of the turbine rotor blades toward the inlet of the body section, in the first or second aspect.

In the third aspect, the flow passage sectional area of the connection section is gradually enlarged, and it is thus possible to reduce the flow rate of exhaust gas even in the connection section and to recover the pressure.

According to a fourth aspect of the present invention, the connection section may include narrowing sections projecting toward the connection section center that is a center of the ellipse from an inner peripheral surface at a position that intersects a short axis of the ellipse, in the diffuser in any one of the first to third aspects. A projecting height of the narrowing sections may gradually increase from the outlet of the turbine rotor blades toward the inlet of the body section.

In the fourth aspect, the connection section is formed into an ellipse, and the narrowing sections are formed. Therefore, it is possible to raise the flow rate of exhaust gas flowing in the vicinity that intersects the long axis of the ellipse. Thus, the flow of the exhaust gas flowing into the body section is likely to follow the inner surface of the body section due to the Coanda effect, and it is possible to curb occurrence of separating off and the like of the exhaust gas.

According to a fifth aspect of the present invention, a turbocharger includes the diffuser according to any one of the first to fourth aspects.

This enables an improvement in efficiency of the turbocharger.

Advantageous Effects of Invention

According to the diffuser and the turbocharger, it is possible to improve efficiency while curbing an increase in size.

DESCRIPTION OF EMBODIMENTS

First Embodiment

Next, a diffuser and a turbocharger according to a first embodiment of the present invention will be described on the basis of drawings.

Figure 1:
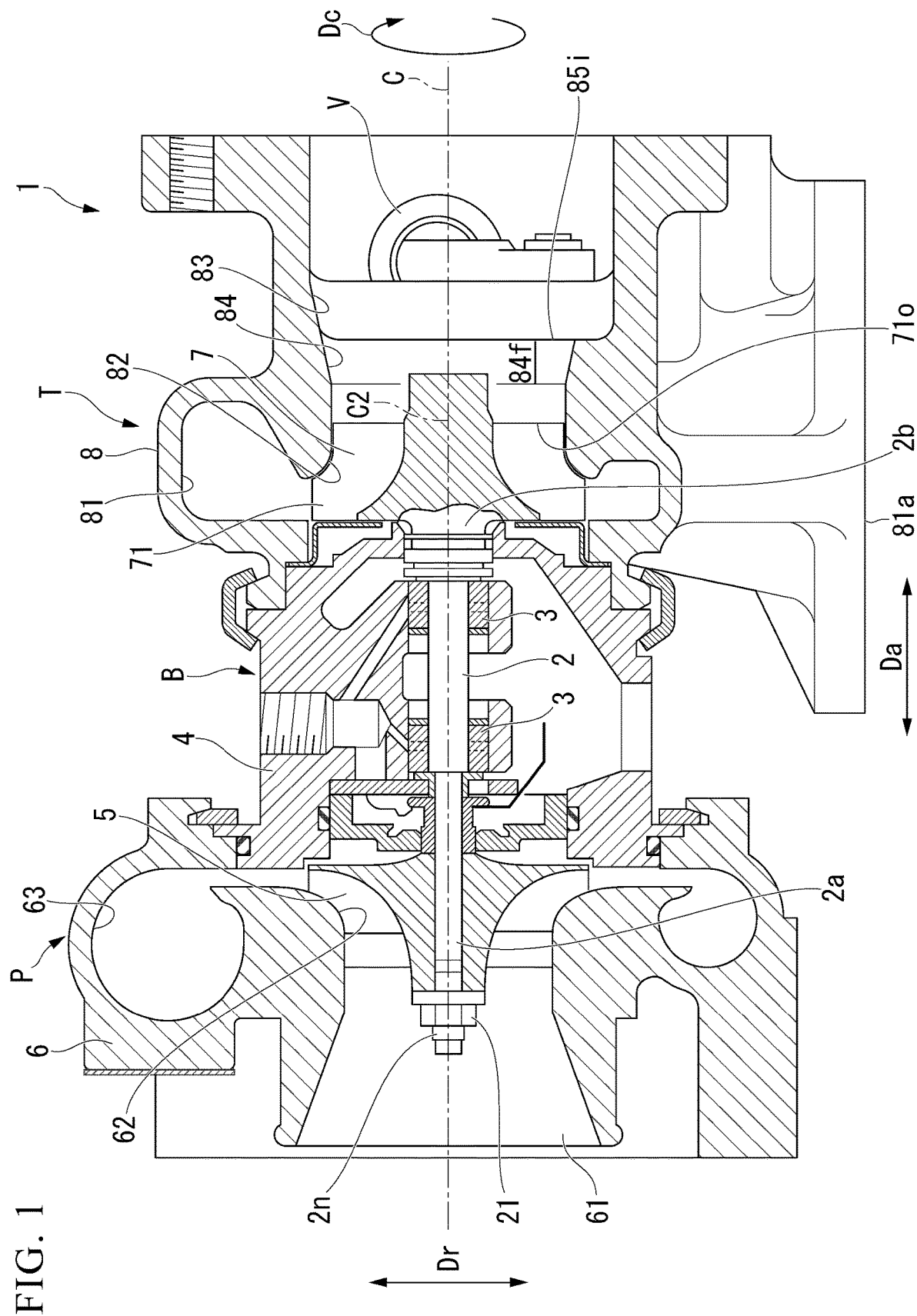
FIG. 1 is a sectional view of a turbocharger according to a first embodiment of the present invention.

FIG. 1 is a sectional view of the turbocharger according to the first embodiment of the present invention.

As illustrated in FIG. 1, a turbocharger 1 includes a bearing section B, a turbine section T, and a compressor section P. The turbocharger 1 is used as an auxiliary device of an internal combustion engine for a vehicle such as a car or a ship, for example. The turbocharger 1 converts heat energy of an exhaust gas flow of the engine (not illustrated) into rotational energy using the turbine section T. The rotational energy converted by the turbine section T is delivered to the compressor section P via a rotation shaft 2 supported by the bearing section B. The compressor section P compresses air using the delivered rotational energy. The air compressed by the compressor section P is supplied as supplied air to an engine (not illustrated). The one-dotted dashed line illustrated in FIG. 1 represents a central axis (axial line) C of the rotation shaft 2. In the following description, the axial direction in which the central axis C of the rotation shaft 2 extends will be referred to as an "axial direction Da", the radial direction centered on the central axis C will be referred to as a "radial direction Dr", and the circumferential direction around the central axis C will be referred to as a "circumferential direction Dc".

The bearing section B includes a bearing 3 and a bearing housing 4.

The bearing 3 is disposed inside the bearing housing 4 and rotatably supports the rotation shaft 2. The bearing 3 in the embodiment supports the rotation shaft 2 at a plurality of locations at intervals in the axial direction Da. The bearing housing 4 is formed so as to cover the rotation shaft 2 and the bearing 3 from the outside. The bearing section B exemplified in the embodiment is a fluid bearing that forms a fluid film, and the bearing housing 4 includes a fluid flow passage for supplying a lubricant fluid from the outside to the bearing 3 therein. Although detailed description will be omitted here, the bearing section B further includes a configuration that receives a load of the rotation shaft 2 in the thrust direction, namely a configuration corresponding to a thrust bearing.

The compressor section P is provided to be adjacent to one side of the bearing section B in the axial direction Da. The compressor section P includes a compressor wheel 5 and a compressor housing 6. The compressor wheel 5 is referred to as an impeller in a centrifugal compressor and is provided at a first end 2a of the rotation shaft 2. The compressor wheel 5 exemplified in the embodiment is coupled by screwing a nut 21 to a screw section 2n formed at the first end 2a of the rotation shaft 2.

The compressor housing 6 forms an inlet flow passage forming section 61, a compressor wheel accommodation section 62, and a compressor scrolling section 63.

The inlet flow passage forming section 61 forms a flow passage configured to guide air to the compressor wheel accommodation section 62. The inlet flow passage forming section 61 is formed into a tubular shape around the central axis C, and an inner space thereof communicates with the inner space of the compressor wheel accommodation section 62.

The compressor wheel accommodation section 62 forms a space for accommodating the compressor wheel 5 therein.

The compressor scrolling section 63 is disposed outside the compressor wheel accommodation section 62 in the radial direction Dr and communicates with the compressor wheel accommodation section 62 in the radial direction Dr.

The compressor scrolling section 63 is formed so as to extend in the circumferential direction Dc outside the compressor wheel accommodation section 62 in the radial direction Dr and such that the flow passage sectional area is gradually enlarged toward a scroll outlet (not illustrated). The compressor scrolling section 63 is connected to the engine (not illustrated) via an intake pipe, an intercooler (both of which are not illustrated), and the like.

The turbine section T is provided to be adjacent to the bearing section B on a second side in the axial direction Da. The turbine section T includes a turbine wheel 7 and a turbine housing 8.

The turbine wheel 7 is a turbine wheel that configures a so-called radial flow turbine configured to cause exhaust gas that has flowed in from the outside in the radial direction Dr to flow toward the second side in the axial direction Da. The turbine wheel 7 includes a plurality of turbine rotor blades 71 disposed at intervals in the circumferential direction Dc. The turbine wheel 7 is provided integrally with a second end 2b of the rotation shaft 2. In other words, the rotation shaft 2 and the compressor wheel 5 are integrally rotated about the central axis C along with the turbine wheel 7 by the turbine wheel 7 rotating about the central axis C.

The turbine housing 8 includes a turbine scrolling section 81, a turbine wheel accommodation section 82, and a diffuser 83.

The turbine scrolling section 81 is disposed outside the turbine wheel accommodation section 82 in the radial direction Dr and extends in the circumferential direction Dc. The turbine scrolling section 81 communicates with the turbine wheel accommodation section 82 in the radial direction Dr.

The flow passage sectional area of the turbine scrolling section 81 is formed to gradually reduce in size toward the side away from the scroll inlet 81a, from which the exhaust gas flows, in the circumferential direction Dc. The scroll inlet 81a of the turbine scrolling section 81 is connected to the engine (not illustrated) via an exhaust pipe.

The turbine wheel accommodation section 82 forms a space for accommodating the turbine wheel 7. The exhaust gas that has flowed from the turbine scrolling section 81 to the turbine wheel accommodation section 82 flows to portions between turbine rotor blades 71 of the turbine wheel 7 from the outside in the radial direction Dr. The exhaust gas that has flowed to the portions between the turbine rotor blades 71 causes the turbine wheel 7 to rotate and flows out toward the second side in the axial direction Da along the central axis C of the turbine wheel 7.

Figure 2:
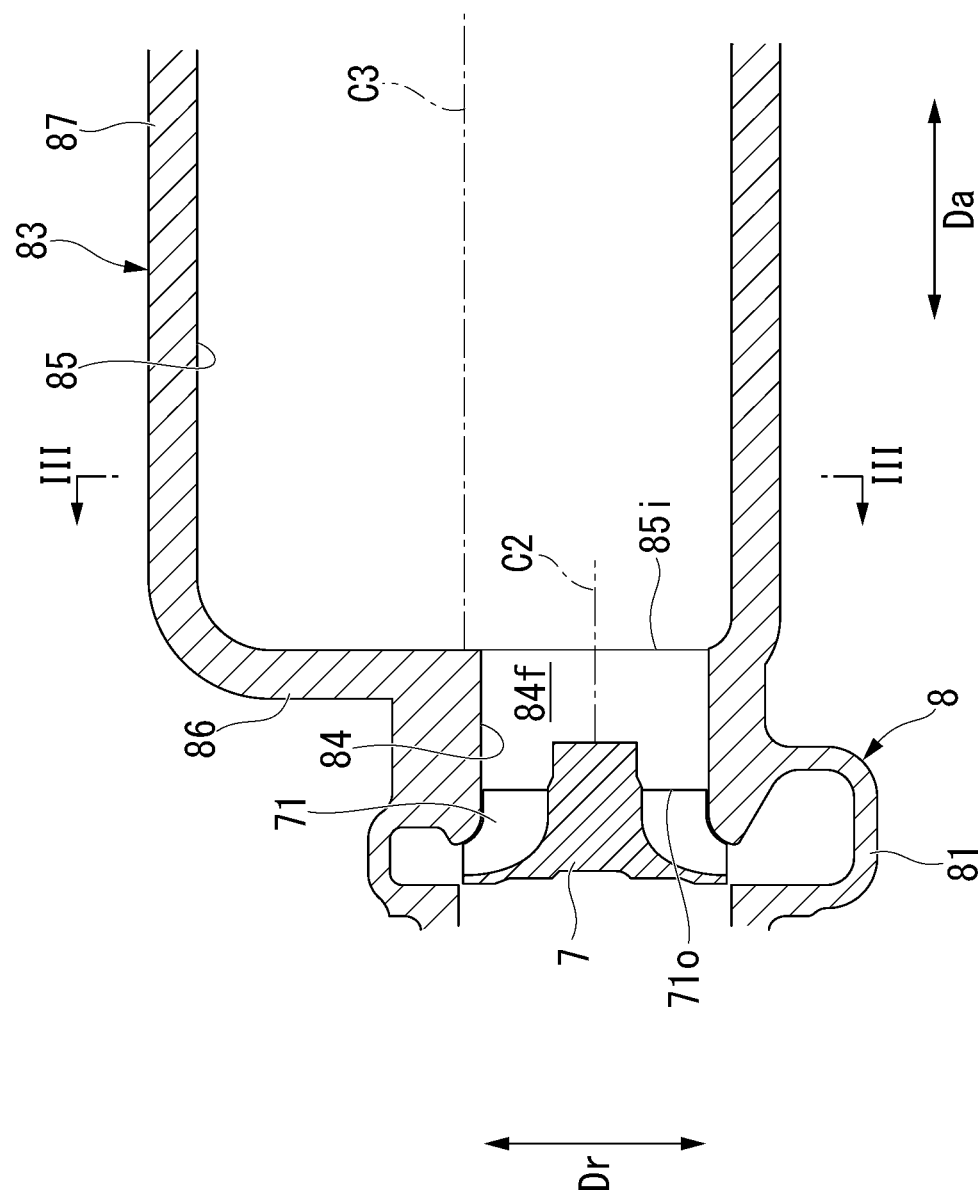
FIG. 2 is a sectional view of a diffuser according to the first embodiment of the present invention.
Figure 3:
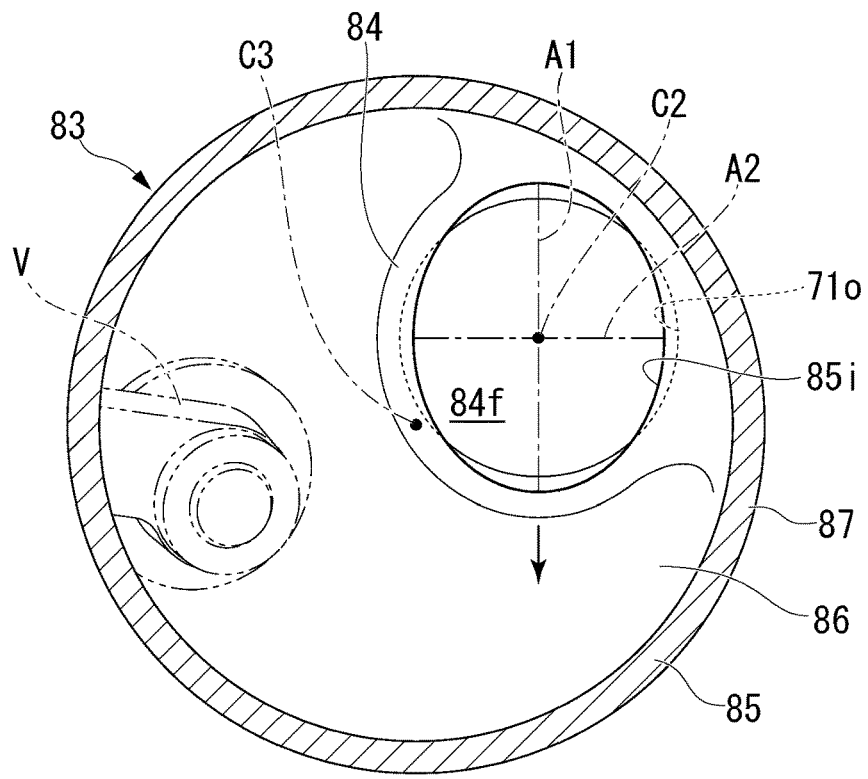
FIG. 3 is a sectional view taken along the line III-III in FIG. 2.

FIG. 2 is a sectional view of the diffuser according to the first embodiment of the present invention. FIG. 3 is a sectional view taken along the line III-III in FIG. 2.

The diffuser 83 reduces the flow rate of exhaust gas flowing out from the turbine wheel 7 and recovers the pressure of the exhaust gas. As illustrated in FIGS. 1 and 2, the diffuser 83 includes a connection section 84 and a body section 85.

The connection section 84 extends from an outlet 710 of the turbine rotor blades 71 and forms a connection flow passage 84f configured to guide the exhaust gas discharged from the turbine rotor blades 71 to the body section 85. The connection section 84 in the embodiment extends in a straight line from the outlet 710 of the turbine rotor blades 71 toward the second side in the axial direction Da. A central axis (connection section center) C of the connection section 84 is formed linearly to overlap with the central axis C2 of the rotation shaft 2.

As illustrated in FIGS. 2 and 3, the flow passage shape of the connection section 84 in the section that perpendicularly intersects the central axis C2 (hereinafter, simply referred to as a flow passage sectional shape) is formed into a circle (in other words, a substantially true circular shape) at the outlet 710 of the turbine rotor blades 71. Further, the flow passage sectional shape of the connection section 84 is formed into an ellipse at an inlet 85i of the body section 85. The flow passage sectional shape of the connection section 84 is formed to gradually approach the ellipse at the inlet 85i from the outlet 710 toward the inlet 85i. The flow passage sectional shape of the connection section 84 in the embodiment changes such that a long axis A1 becomes gradually elongated while a short axis A2 gradually shortens from the outlet 710 of the turbine rotor blades 71 toward the inlet 85i of the body section 85.

Further, in the embodiment, the flow passage sectional area of the connection section 84 does not change and is kept constant from the outlet 710 of the turbine rotor blades 71 toward the inlet 85i of the body section 85. The flow passage sectional shape of the connection section 84 at the inlet 85i may be an ellipse in which the long axis is set to be as long as possible in accordance with a space in the vicinity of the inlet 85i of the body section 85.

The body section 85 is connected to an end of the connection section 84 on the downstream side (in other words, the inlet 85i of the body section 85). The body section 85 extends in the axial direction Da. The flow passage sectional area that perpendicularly intersects a central axis (body section center) C3 of the body section 85 is greater than the flow passage sectional area of the connection section 84. A case in which the flow passage sectional area of the body section 85 in the embodiment is equal to or greater than double the flow passage sectional area of the connection section 84 on the side of the inlet 85i is exemplified.

The body section 85 includes an upstream side wall 86 extending in the radial direction Dr from the vicinity of the inlet 85i. The body section 85 further includes a tubular section 87 extending in the axial direction from an outer peripheral section 86a of the upstream side wall 86. In other words, the flow passage sectional area of the diffuser 83 is steeply enlarged at the position of the inlet 85i of the body section 85. A case in which the flow passage sectional area inside the tubular section 87 is constant in the axial direction Da is exemplified. The flow passage sectional area of the tubular section 87 may be gradually enlarged toward the second side in the axial direction Da. The tubular section 87 exemplified in the embodiment is formed into a tubular shape with a circular sectional surface.

The central axis C3 at the center of the flow passage sectional surface of the body section 85 is disposed at a position deviating from the central axis C2 of the connection section 84. In other words, the center of the ellipse of the connection section 84 at the inlet 85i is disposed at a position deviating from the center of the flow passage sectional surface of the body section 85. Note that in the embodiment, a waste gate valve V is disposed in a space in the upstream side wall 86 on the side opposite to the central axis C2 with the central axis C3 interposed therebetween. Opening the waste gate valve V allows the exhaust gas to flow into the diffuser 83 without passing through the turbine scrolling section 81 and the turbine wheel 7.

The ellipse of the connection section 84 at the inlet 85i of the body section 85 is formed such that the long axis A1 extends at least on the side closer to the central axis C3 than to the central axis C2. In other words, at least one side of the long axis A1 of the ellipse of the connection section 84 extends on a side on which the flow passage of the diffuser 83 is enlarged in the radial direction Dr when seen with the central axis C2 located at the center.

According to the aforementioned first embodiment, the long axis A1 of the ellipse of the flow passage sectional shape of the connection section 84 is elongated toward the downstream side. Therefore, the exhaust gas flowing through the connection section 84 is likely to spread in the direction of the long axis A1 (the direction represented by the arrow in FIG. 3) of the ellipse of the connection section 84 when the exhaust gas flows from the connection section 84 to the body section 85. The exhaust gas spreading inside the body section 85 in this manner enables a decrease in flow rate of the exhaust gas. As a result, it is possible to improve efficiency of the diffuser 83 while curbing an increase in size of the diffuser 83.

Further, the diffuser 83 according to the first embodiment is adapted such that the central axis C2 of the connection section 84 deviates from the central axis C3 of the body section 85. In other words, the body section 85 is formed such that the inner space is enlarged more on the side on which the central axis C3 is disposed than on the side of the central axis C2. The long axis A1 of the ellipse of the connection section 84 extends closer to the central axis C3 than to the central axis C2. It is thus possible to allow the exhaust gas flowing from the inlet 85i of the body section 85 to the body section 85 to spread on the side on which the inner space of the body section 85 is enlarged. Therefore, the exhaust gas is likely to spread in the inner space of the body section 85, and it is possible to further reduce the flow rate of the exhaust gas.

Also, it is possible to improve efficiency of the diffuser 83 and thereby to improve efficiency of the turbocharger 1.

Second Embodiment

Next, a second embodiment of the present invention will be described with reference to drawings. Since the second embodiment is adapted merely by providing narrowing sections at the aforementioned connection section, the same reference numerals will be applied to components the same as those in the first embodiment for description, and detailed description of the entire turbocharger will be omitted.

Figure 4:
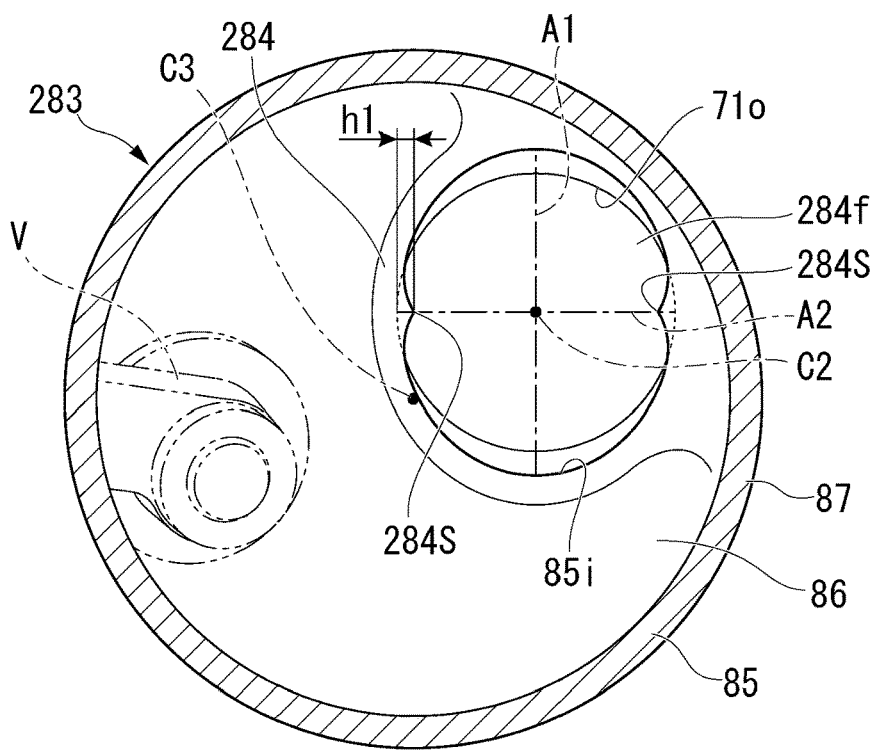
FIG. 4 is a sectional view corresponding to FIG. 3 according to a second embodiment of the present invention.

FIG. 4 is a sectional view corresponding to FIG. 3 in the second embodiment of the present invention.

As illustrated in FIG. 4, a diffuser 283 according to the second embodiment includes a connection section 284 and the body section 85 similarly to the diffuser 83 according to the first embodiment. The connection section 284 extends from the outlet 710 of the turbine rotor blades 71 and forms a connection flow passage 284f configured to guide exhaust gas discharged from the turbine rotor blades 71 to the body section 85. The connection section 284 according to the second embodiment extends in a straight line from the outlet 710 of the turbine rotor blades 71 toward the second side in the radial direction Da similarly to the connection section 84 according to the first embodiment. The central axis C2 of the connection section 84 is formed linearly so as to overlap the central axis C of the rotation shaft 2 (see FIG. 1).

The flow passage sectional shape of the connection section 284 is formed into a circle (in other words, a substantially true circular shape) at the outlet 710 of the turbine rotor blades 71. The flow passage sectional shape of the connection section 284 is formed such that narrowing sections 284S are added to the ellipse described above in the first embodiment at the inlet 85i of the body section 85. Although the flow passage sectional shape of the connection section 284 is not an ellipse here, the flow passage sectional shape is a shape obtained by deforming an ellipse as a basis, and description will be given using the long axis A1 and the short axis A2 of the ellipse as a reference in some cases for convenience of explanation.

The narrowing sections 284S project from the inner peripheral surface of the connection section 284 at positions that intersect the short axis A2 of the ellipse toward the central axis C2. Here, a projecting height h1 of each of the narrowing sections 284S can be set to such an extent that the flow passage sectional area at the inlet 85i of the connection section 284 does not decrease relative to the flow passage sectional area of the circle of the connection section 284 at the outlet 710, for example. The narrowing sections 284S exemplified in the second embodiment may be formed as combinations of recessed curved surfaces and projecting curved surfaces such that no corners are formed on the inner peripheral surface of the connection section 284.

The flow passage sectional shape of the connection section 284 is formed to gradually approach the shape of the inlet 85i from the outlet 710 toward the inlet 85i. The flow passage sectional shape of the connection section 84 according to the second embodiment changes such that the long axis A1 is gradually elongated and the height h1 of the narrowing sections 284S gradually increases from the outlet 710 of the turbine rotor blades 71 toward the inlet 85i of the body section 85.

In the second embodiment, the flow passage sectional area of the connection section 284 does not change and is kept constant from the outlet 710 of the turbine rotor blades 71 to the inlet 85i of the body section 85 similarly to the first embodiment.

The body section 85 has a configuration that is similar to that in the first embodiment and is connected to an end of the connection section 284 on the downstream side. The body section 85 extends in the axial direction Da. The flow passage sectional area that perpendicularly intersects the central axis C of the body section 85 is greater than the flow passage sectional area of the connection section 84. A case in which the flow passage sectional area of the body section 85 of the diffuser 83 according to the second embodiment is equal to or greater than a double of the flow passage sectional area of the connection section 84 on the side of the inlet 85i of the body section 85 similarly to the first embodiment is exemplified.

The body section 85 includes the upstream side wall 86 and the tubular section 87. In other words, the flow passage sectional area of the diffuser 83 is steeply enlarged at the position of the inlet 85i of the body section 85. The flow passage sectional area inside the tubular section 87 may be constant in the axial direction Da or may be gradually enlarged toward the second side in the axial direction Da. The tubular section 87 exemplified in the embodiment is formed into a tubular shape with a circular sectional surface.

The central axis (body section center) C3 that is the center of the flow passage sectional surface of the body section 85 is disposed at a position deviating from the central axis C2 of the connection section 284. In other words, the center of the ellipse that is a reference of the connection section 284 at the inlet 85i is disposed at a position deviating from the center of the flow passage sectional surface of the body section 85. Note that the waste gate valve V is disposed in the space of the upstream side wall 86 on the side opposite to the central axis C2 with the central axis C3 interposed therebetween in the second embodiment as well.

The flow passage sectional shape of the connection section 284 at the inlet 85i of the body section 85 is formed such that the long axis A1 extends at least to the side closer to the central axis C3 than to the central axis C2. In other words, at least one side of the long axis A1 of the flow passage sectional shape at the connection section 284 extends on the side on which the flow passage is enlarged in the radial direction Dr in the diffuser 283 when seen with the central axis C2 located at the center.

According to the aforementioned second embodiment, the connection section 284 is formed into an ellipse, and the narrowing sections 284S are formed. It is thus possible to raise the flow rate of the exhaust gas flowing through the vicinity at which the long axis A1 of the ellipse that is a reference and the inner peripheral surface of the connection section 284 intersect. Therefore, the flow of the exhaust gas that has flowed into the body section 85 is likely to follow the inner surface of the body section 85 due to the Coanda effect, and it is possible to curb occurrence of separating off and the like of the exhaust gas.

Modification Example of Embodiments

In the aforementioned first embodiment and second embodiment, the case in which the flow passage sectional areas of the connection sections 84 and 284 of the diffusers 83 and 283 are kept constant from the outlet 710 of the turbine rotor blades 71 to the inlet 85i of the body section 85 has been described as an example. However, the present invention is not limited to the case in which the flow passage sectional areas of the connection sections 84 and 284 are kept constant from the outlet 710 of the turbine rotor blades 71 to the inlet 85i of the body section 85. For example, the flow passage sectional areas of the connection sections 84 and 284 may be gradually enlarged from the outlet 710 of the turbine rotor blades 71 toward the inlet 85i of the body section 85. Note that in the following description of the modification example, only a modification example of the first embodiment will be described in detail, and detailed description of a modification example of the second embodiment will be omitted. Also, the same reference signs will be applied to the same components as those in the first embodiment for description.

Figure 5:
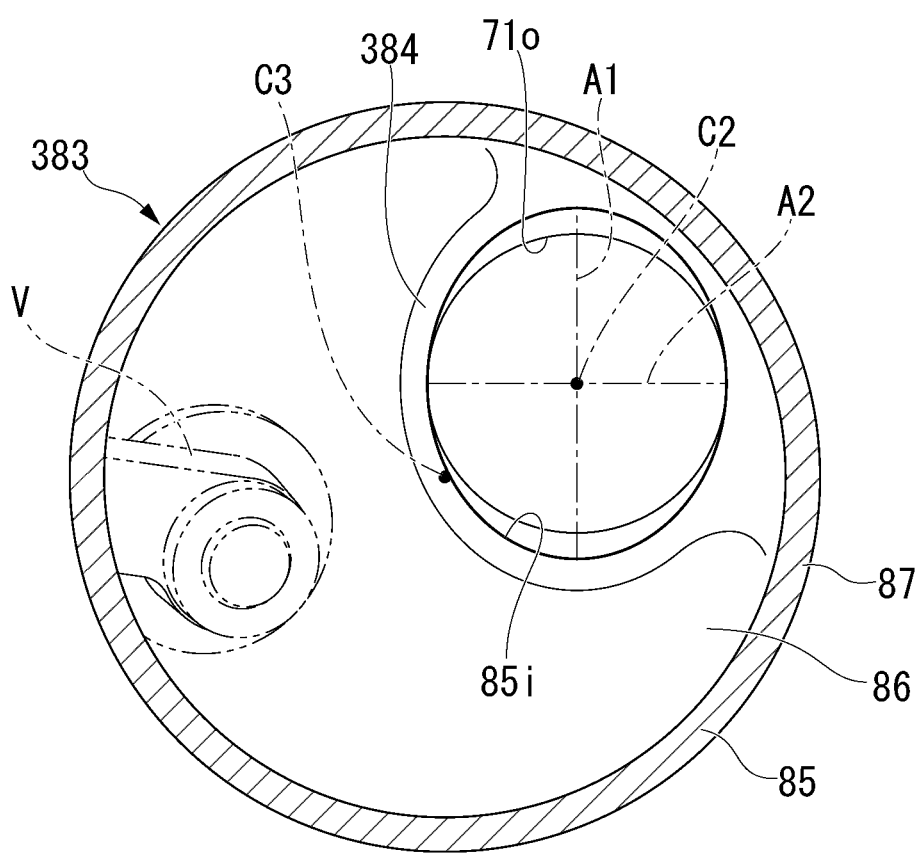
FIG. 5 is a sectional view corresponding to FIG. 3 according to a modification example of the first embodiment of the present invention.

FIG. 5 is a sectional view corresponding to FIG. 3 according to the modification example of the first embodiment of the present invention.

As illustrated in FIG. 5, for example, the flow passage sectional shape of a connection section 384 of a diffuser 383 according to the modification example is a circle at the outlet 710 of the turbine rotor blade 71 and is an ellipse at the inlet 85$i$ of the body section 85. The flow passage sectional shape of the connection section 84 is formed to gradually approach the ellipse of the inlet 85$i$ from the outlet 710 to the inlet 85$i$.

Here, the short axis A2 of the ellipse of the connection section 84 at the inlet 85$i$ of the body section 85 is the same as the diameter of the circle at the outlet 710 of the turbine rotor blade 71 in the connection section 384 exemplified in the modification example. In other words, the flow passage sectional area of the connection section 384 is gradually enlarged only in the direction of the long axis A1 of the ellipse of the outlet 710 from the outlet 710 of the turbine rotor blade 71 toward the inlet 85$i$ of the body section 85. Here, an inclination angle (in other words, the angle of gradual enlargement) of the inner peripheral surface of the connection section 384 that intersects the long axis A1 of the ellipse can be within a range of 10 degrees to 20 degrees relative to the central axis C2. By causing the inclination angle to fall within such a range, it is possible to curb occurrence of separating off and the like in exhaust gas flowing through the connection section 384.

Although the case in which the flow passage sectional area of the connection section 384 illustrated in FIG. 5 is enlarged only in the direction of the long axis A1 has been described, the flow passage sectional area may be enlarged in the direction of the short axis A2 as well if there is a room in the space. Similarly to the second embodiment, the narrowing sections 284S may be provided at the connection section 384.

Therefore, since the flow passage sectional area of the connection section 384 is gradually enlarged, it is possible to reduce the flow rate of the exhaust gas and to recover the pressure even inside the connection section 384 as well, according to the modification example of the embodiment.

Other Modification Examples

The present invention is not limited to the aforementioned embodiments and modification example and includes various modifications added to the aforementioned embodiments and modification example without departing from the gist of the present invention. In other words, specific shapes, configurations, and the like described in the embodiments and the modification example are just examples, and appropriate modifications can be added thereto.

For example, the central axis C3 may be disposed on an extended line of the long axis of the flow passage sectional shape of each of the connection sections 84, 284, and 384, at the inlet 85$i$ of the body section 85. In this manner, it is possible to cause the direction in which the exhaust gas flowing from the inlet 85$i$ of the body section 85 to the body section 85 spreads to conform to the direction in which the flow passage is steeply enlarged to the maximum extent in the diffuser 83.

In the aforementioned embodiments, the case in which the waste gate valve V is disposed on the side opposite to the central axis C2 with the central axis C3 interposed therebetween has been described. However, disposition of the waste gate valve V is not limited to this disposition.

In the aforementioned embodiments, the case in which the flow passage sectional shape of the body section 85 is a circle has been described. However, the flow passage sectional shape of the body section 85 is not limited to the aforementioned shape as long as the flow passage sectional shape is a shape with the flow passage sectional area that is rapidly enlarged as compared with the connection section 84, 284, or 384.

In the aforementioned embodiments, the turbocharger 1 provided with the waste gate valve V has been described as an example. However, the turbocharger may not have the waste gate valve V as long as the flow passage sectional area of the body section 85 is rapidly enlarged from the flow passage sectional area of the connection section 84, 284, or 384. As a turbocharger that does not include the waste gate valve V, a variable geometry (VG) turbo can be exemplified.

In the aforementioned embodiments, a case in which a scroll of the turbocharger 1 is a single scroll has been exemplified. However, the scroll of the turbocharger 1 may be a split-type scroll such twin scrolls.

In the aforementioned embodiments, the case in which the entire periphery of the end edge of the body section 85 on the side of the outlet is disposed in the same virtual plane that is vertical to the central axis C (in other words, the case in which the entire periphery of the end surface of the body section 85 on the side of the outlet is formed so as to be vertical to the axial line C) has been exemplified. However, the shape of the end edge of the body section 85 on the side of the outlet is not limited to the aforementioned shape, and various shapes may be employed.

In the aforementioned embodiments, the case in which the diffusers 83, 283, and 383 are diffusers of the turbocharger 1 provided with the compressor section P and the turbine section T has been described as an example. However, the diffuser 83 may be any diffuser as long as the flow passage sectional area of the body section 85 is rapidly enlarged relative to the connection section 84, 284, and 384, and the diffuser 83 is not limited to the diffuser of the turbocharger 1. Further, the turbocharger 1 is not limited to a turbocharger used as an auxiliary device for an internal combustion engine of a vehicle such as a car, a ship, or the like.

INDUSTRIAL APPLICABILITY

The present invention can be applied to a diffuser and a turbocharger. According to the present invention, it is possible to improve efficiency while curbing an increase in size.

REFERENCE SIGNS LIST

1 Turbocharger
2 Rotation shaft
2$a$ First end
2$b$ Second end
2$n$ Screw section
3 Bearing
4 Bearing housing
5 Compressor wheel
6 Compressor housing
7 Turbine wheel
8 Turbine housing
21 Nut
61 Inlet flow passage forming section
62 Compressor wheel accommodation section
63 Compressor scrolling section
71 Turbine rotor blade
710 Outlet
81 Turbine scrolling section
81$a$ Scroll inlet 82 Turbine wheel accommodation section
83, 283, 383 Diffuser
84, 284, 384 Connection section
85 Body section
85i Inlet
86 Upstream side wall
86a Outer peripheral section
87 Tubular section
284S Narrowing section

The invention claimed is:

1. A diffuser comprising:
a connection section extending from an outlet of turbine rotor blades of a turbine wheel and in a straight line in an axial direction in which a rotation shaft of the turbine wheel extends; and
a body section connected to an end of the connection section on a downstream side and having a larger flow passage sectional area than the connection section,
wherein a shape of a flow passage sectional surface of the connection section is formed into a circle at the outlet of the turbine rotor blades and into an ellipse at an inlet of the body section, and is formed to be gradually enlarged in a long-axis direction of the ellipse from the outlet of the turbine rotor blades toward the inlet of the body section.

2. The diffuser according to claim 1,
wherein a connection section center that is a center of the ellipse of the connection section at the inlet of the body section is located at a position deviating from a body section center that is a center of the flow passage sectional surface of the body section, and
a long axis of the ellipse extends on a side at least closer to the body section center than to the connection section center.

3. The diffuser according to claim 1, wherein the flow passage sectional area of the connection section is gradually enlarged from the outlet of the turbine rotor blades toward the inlet of the body section.

4. The diffuser according to claim 1,
wherein the connection section includes narrowing sections projecting toward the connection section center that is a center of the ellipse from an inner peripheral surface at a position that intersects a short axis of the ellipse, and
a projecting height of the narrowing sections gradually increases from the outlet of the turbine rotor blades toward the inlet of the body section.

5. A turbocharger comprising:
the diffuser according to claim 1.

6. The diffuser according to claim 2, wherein the flow passage sectional area of the connection section is gradually enlarged from the outlet of the turbine rotor blades toward the inlet of the body section.

7. The diffuser according to claim 2,
wherein the connection section includes narrowing sections projecting toward the connection section center that is a center of the ellipse from an inner peripheral surface at a position that intersects a short axis of the ellipse, and
a projecting height of the narrowing sections gradually increases from the outlet of the turbine rotor blades toward the inlet of the body section.

8. The diffuser according to claim 3,
wherein the connection section includes narrowing sections projecting toward the connection section center that is a center of the ellipse from an inner peripheral surface at a position that intersects a short axis of the ellipse, and
a projecting height of the narrowing sections gradually increases from the outlet of the turbine rotor blades toward the inlet of the body section.

9. A turbocharger comprising:
the diffuser according to claim 2.

10. A turbocharger comprising:
the diffuser according to claim 3.

11. A turbocharger comprising:
the diffuser according to claim 4.

12. The diffuser according to claim 1,
wherein the connection section has a connection section center that is a central axis of the connection section and that overlaps a central axis of the rotation shaft.

13. The diffuser according to claim 1,
wherein the body section extends in the axial direction.

* * * * *